United States Patent [19]
Kaschke

[11] Patent Number: 5,907,615
[45] Date of Patent: *May 25, 1999

[54] MINIATURE WIRELESS COMMUNICATION DEVICE

[75] Inventor: Kevin D. Kaschke, Hoffman Estates, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 07/984,636

[22] Filed: Dec. 2, 1992

[51] Int. Cl.⁶ .................................................. H04M 1/00
[52] U.S. Cl. .................................... 379/433; 379/434
[58] Field of Search .................................. 379/428, 433, 379/434; 455/127, 90, 89, 351; D14/138, 147, 148

[56] References Cited

U.S. PATENT DOCUMENTS

| | | |
|---|---|---|
| H610 | 3/1989 | Focarile et al. . |
| D. 297,734 | 9/1988 | Soren et al. . |
| D. 297,735 | 9/1988 | Soren et al. . |
| D. 297,736 | 9/1988 | Krolopp et al. . |
| D. 298,244 | 10/1988 | Watanabe . |
| D. 300,742 | 4/1989 | Soren et al. . |
| D. 300,827 | 4/1989 | Soren et al. . |
| D. 305,427 | 1/1990 | Soren et al. . |
| D. 326,091 | 5/1992 | Kikuchi . |
| D. 326,451 | 5/1992 | Roegner . |
| D. 326,452 | 5/1992 | Roegner . |
| D. 361,064 | 8/1995 | Fellinger .................. D14/138 |

(List continued on next page.)

FOREIGN PATENT DOCUMENTS

| | | |
|---|---|---|
| 0263666 | 4/1988 | European Pat. Off. . |
| 0472361A2 | 2/1992 | European Pat. Off. . |
| 0 473 402 A2 | 3/1992 | European Pat. Off. . |
| 0678987A1 | 10/1995 | European Pat. Off. . |
| 3323858A1 | 1/1985 | Germany .................. 379/433 |
| 3401518 | 7/1985 | Germany .................. 379/428 |
| 63-49847 | 4/1984 | Japan . |
| 60-21636 | 2/1985 | Japan . |
| 4-152724 (A) | 5/1992 | Japan . |
| 04273639 | 9/1992 | Japan . |
| 05030166 | 2/1993 | Japan . |
| 05091022 | 4/1993 | Japan . |
| 2186153 | 8/1987 | United Kingdom . |

OTHER PUBLICATIONS

"West Coast Firm Puts 'Beep' Inside Cellular Telephone", Radio Communication Report, Dec. 17, 1990, pp. 1 and 22.

*Primary Examiner*—Jack Chiang
*Attorney, Agent, or Firm*—Rolland R. Hackbart

[57] ABSTRACT

A wireless communication device (10) is provided for maintaining acceptable acoustic coupling, increasing display and data input device capability and increasing antenna performance to encourage further miniaturization and weight reduction thereof. Two moveable housing portions (12) and (14) are moveable between a closed (18) and an open (20) housing position and matively engage to provide an expandable housing while aligning earpiece (26) and microphone (28) transducers on a center axis (30) of the device (10). Paging and radiotelephone functions of the device are configured responsive to the position of the housing portion (12). The housing portion has a lens for viewing a display (46) thereunder and keycaps for actuating a keypad (54) thereunder when the housing portion (12) is in the closed housing position (18). An antenna (56) is extendable beyond the moveable housing portion (12).

20 Claims, 4 Drawing Sheets

U.S. PATENT DOCUMENTS

| | | |
|---|---|---|
| 4,063,046 | 12/1977 | Schiffman et al. . |
| 4,747,122 | 5/1988 | Bhagat et al. . |
| 4,847,818 | 7/1989 | Olsen .................................. 379/428 |
| 5,109,539 | 4/1992 | Inubushi et al. . |
| 5,151,946 | 9/1992 | Martensson ...................... 379/433 |
| 5,164,985 | 11/1992 | Nysen et al. ...................... 455/127 |
| 5,177,784 | 1/1993 | Hu et al. ........................... 379/433 |
| 5,197,091 | 3/1993 | Takagi et al. . |
| 5,214,794 | 5/1993 | Van Wijnen ...................... 455/351 |
| 5,260,998 | 11/1993 | Takagi .............................. 379/433 |
| 5,369,788 | 11/1994 | Nagai . |
| 5,436,625 | 7/1995 | Kubo . |
| 5,436,954 | 7/1995 | Nishiyama et al. . |
| 5,440,629 | 8/1995 | Gray . |
| 5,450,619 | 9/1995 | Maeda . |
| 5,485,517 | 1/1996 | Gray . |
| 5,564,078 | 10/1996 | Nagai . |

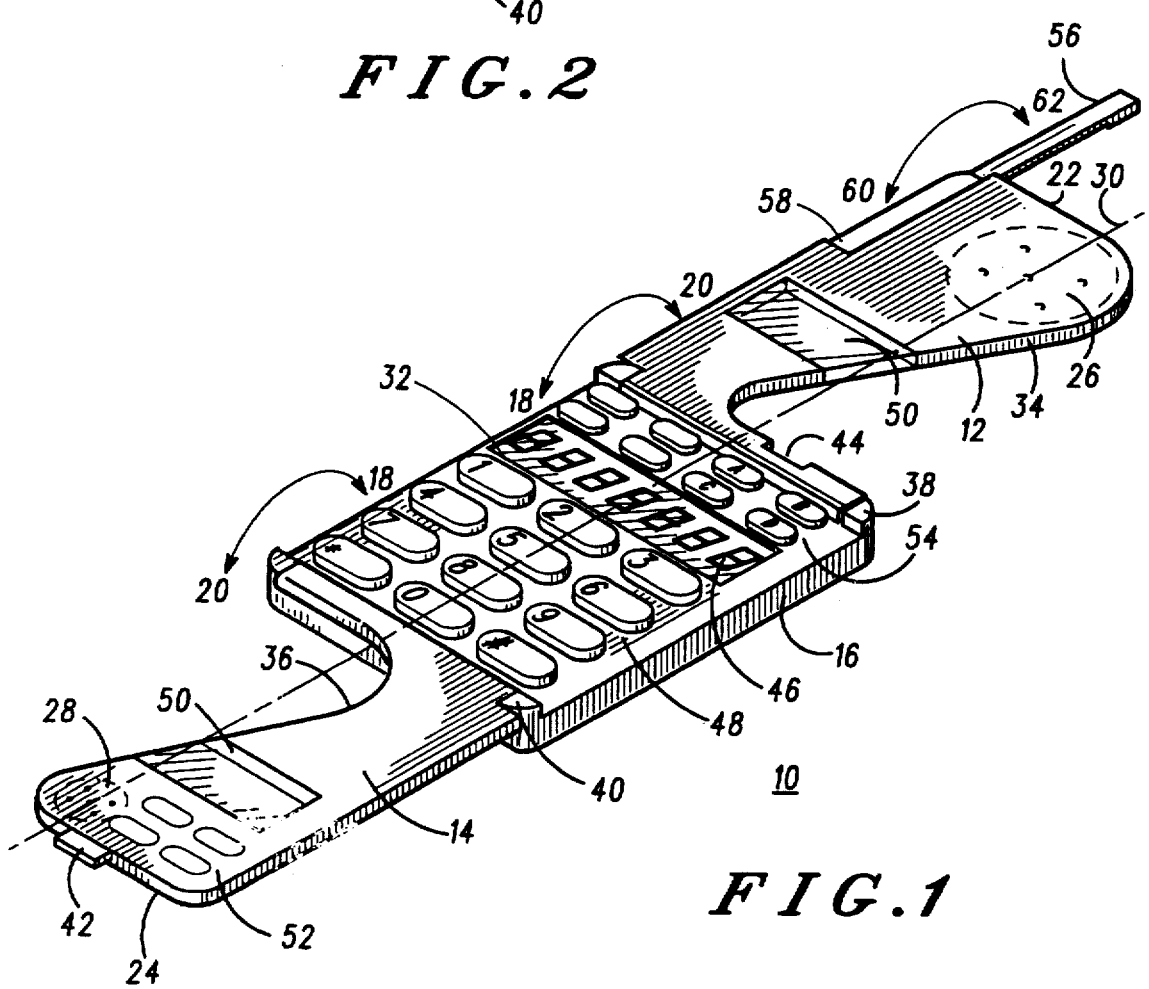

5,907,615

1

MINIATURE WIRELESS COMMUNICATION DEVICE

FIELD OF THE INVENTION

The present invention relates generally to wireless communication devices such as portable radiotelephones and more particularly to the mechanics and operation of such devices.

BACKGROUND OF THE INVENTION

Advances in computing, wireless transceivers, displays, data input devices, batteries, materials and mechanics have promoted the miniaturization and weight reduction of wireless communication devices such as portable radiotelephones. However, there are tradeoffs associated with the advantages of such miniaturization.

Firstly, smaller devices result in a shorter distance between the earpiece and microphone transducers. Since the typical distance between a human ear and mouth remains unchanged, acceptable acoustic coupling between the earpiece transducer and the human ear, and between the microphone transducer and the human mouth is becoming more difficult to maintain. Various solutions have addressed this problem by slidably or rotatably coupling one or more moveable housing elements to the main body portion of the radiotelephone. The housing elements have earpiece or microphone transducers disposed therein. The distance between the earpiece and microphone transducers is increased by moving the housing element to an open position during use and decreased by moving the housing element to a closed position when not in use. Thus, reliable acoustic coupling is achieved when the radiotelephone is in use without compromising miniaturization when the radiotelephone is not in use. Examples of these solutions are shown in U.S. Pat. Nos.: D297,735, D297,734, D326,091, D326,451, D326,452, D298,244, D305,427, D300,827, D300,742, D304,189 and D297,736. However, as the devices become even smaller, the distance between the earpiece and microphone becomes even shorter and the acceptable acoustic coupling is even more difficult to maintain.

Secondly, smaller devices have less space for display and data input devices, such as keypads. The smaller devices have compromised these functions by making display characters and input keys smaller and thus harder to use. Additionally, the market for advanced communication devices is requiring more capability from the display and data input devices which is contradictory to the trend of providing less capability for the sake of miniaturization.

Thirdly, smaller devices have less space for an antenna thereby degrading transmission and/or reception performance. Smaller devices, having smaller antennas, are more susceptible to the well known shadowing phenomenon produced by the position of the human head between the communication device and the nearest base site when the device is held against the head during use.

Thus, there is a need to maintain acceptable acoustic coupling, increase display and data input device capability and increase antenna performance to encourage further miniaturization of wireless communication devices.

BRIEF DESCRIPTION OF THE DRAWINGS

FIG. 1 is a perspective view of a radiotelephone in an open position constructed in accordance with a first preferred embodiment of the present invention.

2

FIG. 2 is a perspective view of the radiotelephone of FIG. 1 in a closed position.

Figure 3:
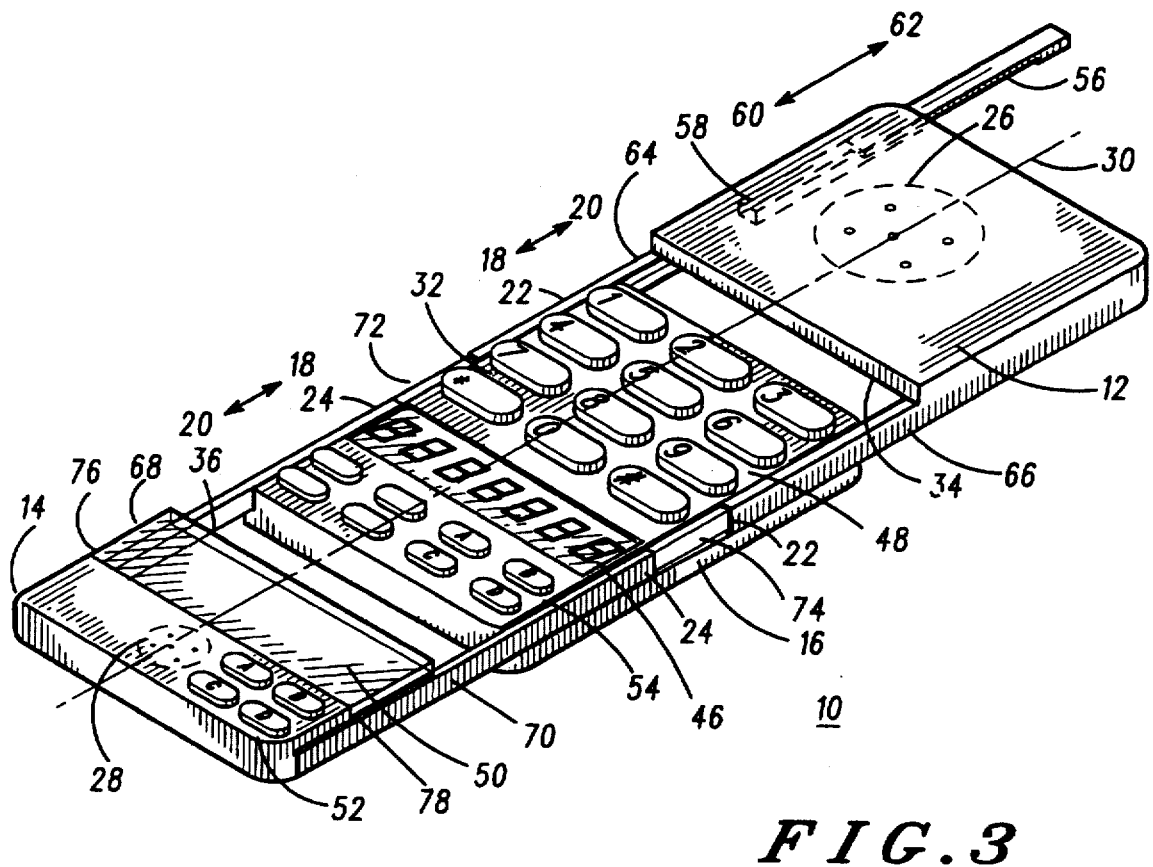

FIG. 3 is a perspective view of a radiotelephone in an open position constructed in accordance with a second preferred embodiment the present invention.

Figure 4:
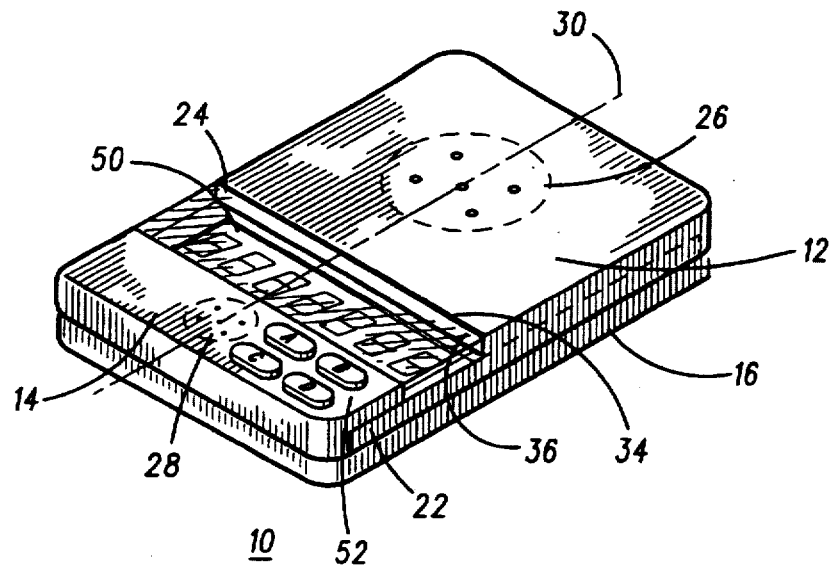

FIG. 4 is a perspective view of the radiotelephone of FIG. 3.

Figure 5:
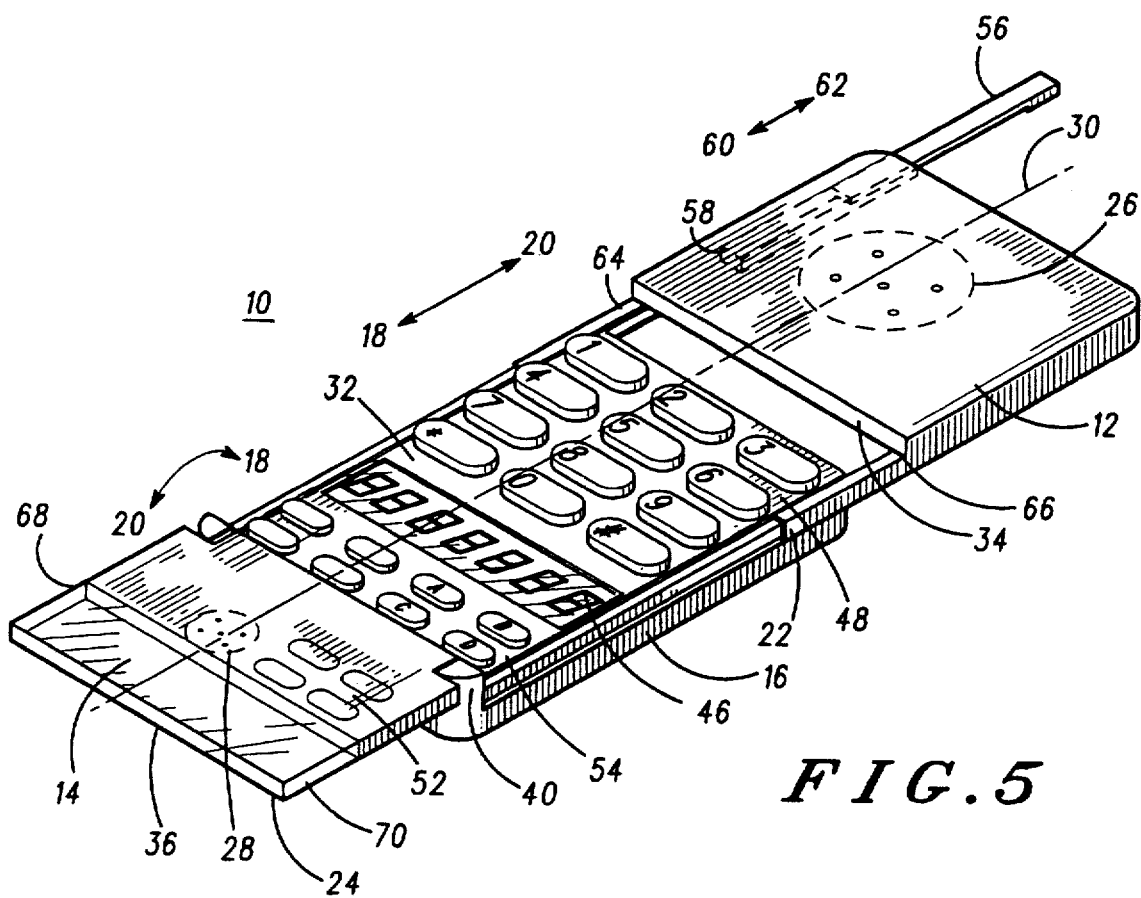

FIG. 5 is a perspective view of a radiotelephone in an open position constructed in accordance with a third preferred embodiment the present invention.

Figure 6:
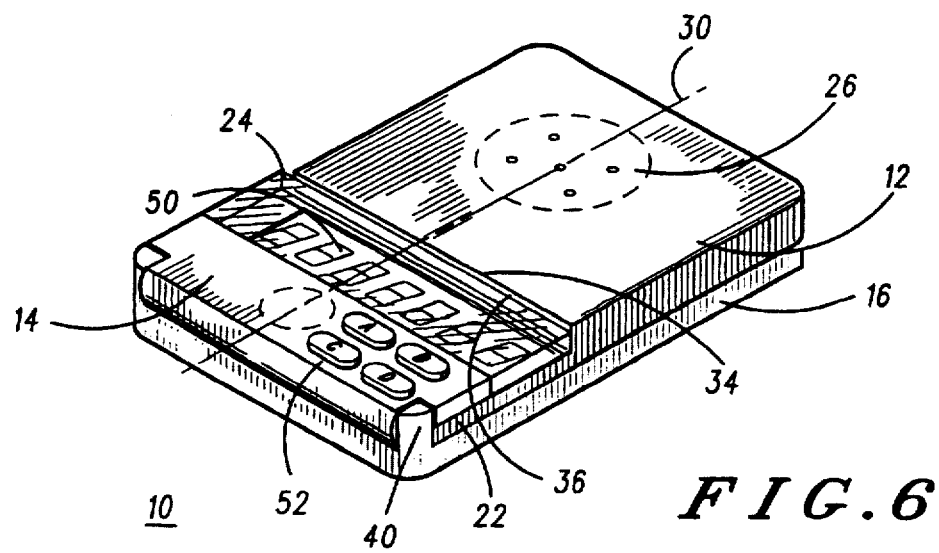

FIG. 6 is a perspective view of the radiotelephone of FIG. 5.

Figure 7:
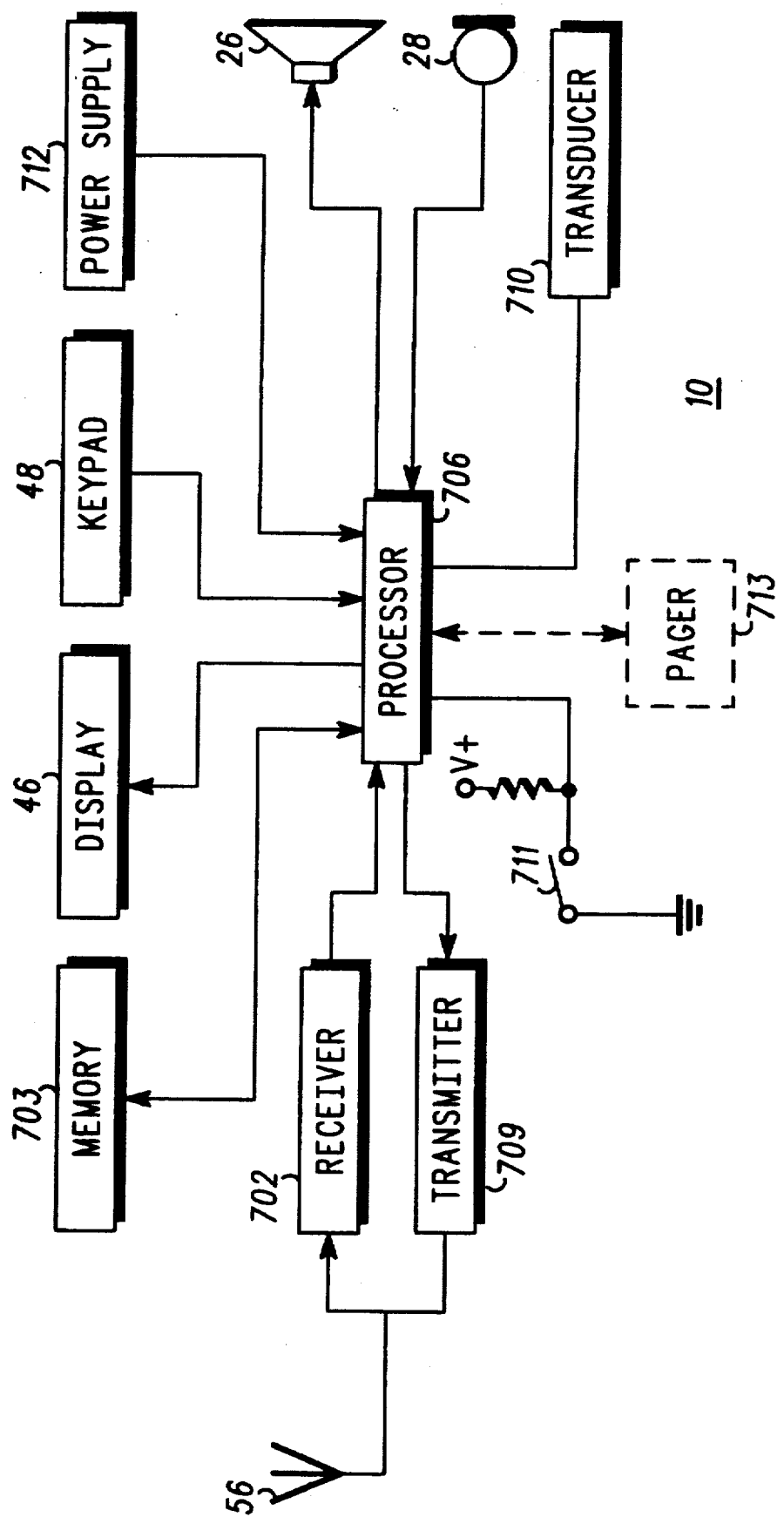

FIG. 7 is a block diagram of the radiotelephone of FIGS. 1–6 and including an optional pager.

DETAILED DESCRIPTION OF THE PREFERRED EMBODIMENT

Referring now to FIGS. 1 and 2, there are shown perspective views of a radiotelephone 10 in an open and closed position, respectively, constructed in accordance with a first preferred embodiment of the present invention. Radiotelephones that may advantageously utilize the present invention include, among others, cellular radiotelephones, cordless radiotelephone one (CT-1) and cordless radiotelephone two (CT-2). The radiotelephone 10 is similar to that of a portable cellular radiotelephone model no. F09HYD8363BG, manufactured and available from Motorola Inc., 600 North U.S. Highway 45, Libertyville, Ill. 60048. Wireless communication devices, such as the radiotelephone 10, are well known in the art and will not be described in detail except to distinguish what is well known and what is described in the preferred embodiments of the present invention.

The radiotelephone 10 comprises a housing assembly having first 12, second 14 and third 16 housing portions. The first 12 and second 14 housing portions are each coupled to the third 16 housing portion. The third housing portion includes a side 32. The first 12 and second 14 housing portions are each moveable between a first, closed position, designated by reference numeral 18 in FIG. 1 and shown in FIG. 2, and a second, open position, designated by reference numeral 20 in FIG. 1 and shown in FIG. 1. The first housing portion 12 is moveable between a first housing position 18 at least partially covering a side 32 of the third housing portion 16 and a second housing position 20 at least partially exposing the side 32 of the third housing portion 16. The second housing portion 14 is moveable between a first housing position 18 at least partially covering the side 32 of the third housing portion 16 and a second housing position 20 at least partially exposing the side 32 of the third housing portion 16.

A unique feature of the radiotelephone 10 is readily apparent from viewing both FIGS. 1 and 2. The first housing portion 12 has an end portion 22. The second housing portion 14 has an end portion 24 extending beyond the end portion 22 of the first housing portion 12 when the first 12 and the second 14 housing portions are moved to their first housing positions 18 at least partially covering the side 32 of the third housing portion 16. Preferably, the length of the first 12 housing portion and the length of the second 14 housing portion are each greater than one-half the length of the third housing portion 16.

A conventional earpiece transducer 26 is coupled to the first housing portion 12 and a conventional microphone transducer 28 is coupled to the second housing portion 28.

The earpiece 26 and microphone 28 transducers are substantially aligned with a center axis 30 of the third housing portion 16. Conventional transceiving means (see FIG. 7), coupled to the earpiece 26 and microphone 28 transducers, is preferably disposed in the third housing portion 16.

In the closed housing position 18, the first 12 and second 14 housing portions are substantially disposed in the same plane and preferably adjacent to the side 32 of the third housing portion 16. Preferably, a side 34 of the first housing portion 12 is shaped to matively engage with a side 36 of the second housing portion 14. Such engagement permits the positioning of the first 12 and second 14 housing portions in the same plane adjacent to the side 32 of the third housing portion 16 while permitting the earpiece 26 and microphone 28 transducers to align with the center axis 30.

Note that in the closed position 18, the holes in the earpiece 26 and microphone 28 transducers are facing towards the side 32 of the third housing portion 16. This produces a very clean appearance on the outside of the radiotelephone 10 when in its closed position 18.

In the open housing position 20, the first housing portion 22 is disposed at an obtuse angle relative to the third housing portion 16, preferably 180°, permitting alignment of the earpiece transducer 26 with a human ear. Similarly, the second housing portion 14 is also disposed at an obtuse angle relative to the third housing portion 16, although preferably 135°, permitting alignment of the microphone transducer 28 with a human mouth. Both the earpiece 26 and microphone 28 transducers remain aligned with the center axis 30 when the first 12 and second 14 housing portions are in the open housing position 20.

Although it would be less desirable than the preferred embodiment, one of the first 12 and second 14 housing portions may overlap the other such that the first 12 and second 14 housing portions are disposed in different and preferably, substantially parallel planes.

In the preferred embodiment of the present invention, the first 12 and second 14 housing portions are rotatably coupled to the third housing portion 16 between the closed 18 and open 20 housing positions via hinge mechanisms 38 and 40, respectively. The first 12 and second 14 housing portions are manually rotated between the open 18 and closed 20 positions, one at a time. The hinge mechanisms also retain each of the first 12 and second 14 housing portions in both the closed 18 and open 20 housing positions. A variety of conventional hinge mechanisms are acceptable for use with the present invention.

The movement of the first housing portion 12 between the closed 18 and open 20 housing positions are coupled to the movement of the second housing portion 14 between the closed 18 and open 20 housing positions. Due to the sculptured shape of the first 12 and second 14 housing portions, one of the housing portions must rotate a predetermined number of degrees relative to the third housing portion 16 before the other housing portion can rotate so that the housing portions do not interfere with each other. The first housing portion 12 is retained in the closed position 18 using the aforementioned hinge mechanism.

The second housing portion 14 includes a conventional spring member as shown in U.S. Pat. No. 4,471,493 coupled to the hinge mechanism 40. The spring member generates a biasing force to urge the second housing portion 14 to its open position 20. A tab 42 coupled to the end portion 24 of the second housing portion 14 is adapted to fit within recess 44 in the hinged area 38 of the first housing portion 12 to maintain the second housing portion 14 in its closed position 18 when the first housing portion 12 is in its closed position 18. When the first housing portion 12 is manually moved to the open position 20, the tab 42 clears the recess 44 permitting the biasing force exerted by the spring member to urge the second housing portion 14 to its open position 20. The radiotelephone 10 may be thereafter closed by closing the first housing portion 12 after the second housing portion 14. Of course, more elaborate coupling mechanisms may be employed to automatically open each of the first 12 and the second 14 housing portions.

The radiotelephone 10 is advantageous in that is contracted to approximately one third of its useable length when in its closed position 18 while providing only one additional layer of housing material. This results in a reduction in thickness of the device and a weight reduction approximately equal to that of one moveable housing portion Furthermore, when the radiotelephone 10 is expanded to its open position 20, the earpiece 26 and microphone 28 transducers remain on the center axis 30 of the third housing portion 10 permitting convenient and comfortable alignment with a human ear and mouth.

The radiotelephone 10 further includes a display 46 and a data input device, such as a keypad 48, preferably coupled to the side 32 of the third housing portion 16. As the radiotelephone 10 becomes smaller, less space is available for the display 46 and keypad 48. However, radiotelephones are being designed with more capability to provide a greater range of services and thus need additional display 46 and keypad 48 resources to support the expanded capability. One such example of added capability is the addition of a selective call receiver functions, such as a conventional pager, to the functionality of the radiotelephone 10. A conventional pager may be of the type model number A04JRC5661A, manufactured and available from Motorola Inc. 1500 N.W. 22nd Avenue, Boynton Beach, Fla. 33426-8292. The combination of a pager and a radiotelephone is already well known in the art.

Such expanded capability problems are overcome by relating paging and radiotelephone modes associated with the wireless communication device 10 to at least one of the first 12 and second 14 housing portions being moved between the closed 18 and open 20 positions. The movement of one housing portion actuates a switch (see FIG. 7) to prompt the device to change a portion of the communication device between paging and radiotelephone functions. A switch actuated responsive to the movement of a housing portion is well known as taught, by example, in U.S. Pat. No. 5,117,073.

For example, display functionality is expanded by displaying paging information when the first housing portion 12 is moved to the closed position 18 and radiotelephone information when the first housing portion 12 is moved to the open housing position 20.

For example, keypad functionality is expanded by having paging functions associated therewith when the first housing portion 12 is in the closed position 18 and radiotelephone functions associated therewith when the first housing portion 12 is moved to the open housing position 20.

The dual modes of the device are not limited to only radiotelephone and paging functions. This feature of the present invention is intended to include any to modes of the wireless communication device. For example, the dual modes alternatively include: radiotelephone vs. notebook functions, private vs. hands-free conversation and cellular vs. cordless functions.

The display 46 and keypad 48 are preferably covered by the moveable housing portions as shown in FIGS. 1 and 2, but do not necessarily need to be covered to gain the expanded functionality provided by the moveable housing portion. An example of a radiotelephone that has a moveable housing portion and does not fully cover the keypad is cordless radiotelephone model number 34986, manufactured and available from Motorola Inc., 600 North U.S. Highway 45, Libertyville, Ill. 60048.

Another unique feature of the wireless communication device 10 as shown in FIGS. 1 and 2 is a substantially transparent portion 50, hereinafter called a lens, coupled to the first 12 and second 14 housing portions. Since the display 46 is at least partially covered by the first housing portion 12 when the first housing portion 12 is moved to the closed housing position 18, the display traditionally becomes of little use. However, the lens 50 is coupled to the first 12 and second 14 housing portions such that the lens is disposed essentially opposite at least a portion of the display 46 when the first 12 and second 14 housing portions are moved to the closed housing position 18. Thus, the display capability is expanded since it can now be used when the housing portions are in their closed position 18. Of course, the lens may optionally be coupled to only one of the moveable housing portions if so desired. In accordance with the previously taught feature, the covered display 46 provides paging information when the housing portions are moved to their closed housing position 18 and radiotelephone information when the housing portions are moved to their open 20 housing position.

Still another unique feature of the wireless communication device 10 as shown in FIGS. 1 and 2 is keycap means 52 coupled to the second housing portion 14. Since the keypad 48 is at least partially covered by the second housing portion 14 when the second housing portion 14 is moved to the closed housing position 18, the keypad 48 traditionally becomes of little use. However, the keycaps 52 are coupled to the second housing portion 14 such that the keycaps 52 are disposed essentially opposite at least a portion of the keypad 54 when the second housing portion 14 is moved to the closed housing position 18. The keycaps 52 are comprised of conventional elastomeric material and protrude through the thickness of the second housing portion 14. The keycaps 52 are coupled to the second housing portion 14 by sandwiching webbing interconnecting individual keycaps between layers of the second housing portion 14. Thus, the keypad capability is expanded since it can now be used when the second housing portion 14 is in its closed position 18. Of course, additional keycaps may also be coupled to the first housing portion 12 if so desired. In accordance with the previously taught feature, the covered portion of the keypad 54 provides paging functions when the second housing portion 14 is moved to its closed housing position 18 and radiotelephone functions when the second housing portion 14 is moved to its open 20 housing position.

Yet, still another unique feature of the wireless communication device 10 as shown in FIGS. 1 and 2 is an antenna 56 coupled to the first housing portion 12. A transceiver (FIG. 7) is substantially disposed in the third housing portion 16. The antenna 56 is coupled to the transceiver and the first housing portion 12. The antenna 56 is moveable between a first, closed, antenna position designated by reference numeral 60 at pocket 58 and a second, open, antenna position designated by reference numeral 62 extended beyond the first housing portion 12. The antenna 56 is shown to be rotatably coupled to the first housing portion 12 between antenna positions 60 and 62. The antenna preferably extends beyond the housing portion having the earpiece transducer 26 such that the antenna extends above a human head.

For miniature radiotelephone 10 having the length of the first housing portion 12 approximately equal to the length of the third housing portion 16, an antenna extending beyond the third housing portion 16 would not reach beyond the length of the first housing portion 12. In this position the shadowing phenomenon reduces the performance of the antenna 56. However, extending the antenna 56 beyond the first, moveable housing portion 12 raises the antenna 56 to an even further extended position away from the radiotelephone 10 and therefore overcomes the shadowing problem resulting in improved antenna performance.

Referring now to FIGS. 3 and 4, there are shown perspective views of a radiotelephone 100 in an open and closed position, respectively, constructed in accordance with a second preferred embodiment of the present invention. The radiotelephone 100 is the same as the radiotelephone 10 shown in in FIGS. 1 and 2 and described in the associated text with the following two exceptions. Firstly, the first 112 and second 114 housing portions are slidably coupled to the third housing portion 116 rather than being rotatably coupled. Secondly, the antenna 156 is slidably coupled to the first housing portion 112 rather than being rotatably coupled.

The radiotelephone 100 comprises a housing assembly having first 112, second 114 and third 116 housing portions. The first 112 and second 114 housing portions are each coupled to the third 116 housing portion. The third housing portion includes a side 132. The first 112 and second 114 housing portions are each moveable between a first, closed position, designated by reference numeral 118 in FIG. 3 and shown in FIG. 4, and a second, open position, designated by reference numeral 120 in FIG. 3 and shown in FIG. 3. The first housing portion 112 is moveable between a first housing position 118 at least partially covering a side 132 of the third housing portion 116 and a second housing position 120 at least partially exposing the side 132 of the third housing portion 116. The second housing portion 114 is moveable between a first housing position 118 at least partially covering the side 132 of the third housing portion 116 and a second housing position 120 at least partially exposing the side 132 of the third housing portion 116.

A unique feature of the radiotelephone 110 is readily apparent from viewing both FIGS. 3 and 4. The first housing portion 112 has an end portion 122. The second housing portion 114 has an end portion 124 extending beyond the end portion 122 of the first housing portion 112 when the first 112 and the second 114 housing portions are moved to their first housing positions 118 at least partially covering the side 132 of the third housing portion 116. Preferably, the length of the first 112 housing portion and the length of the second 114 housing portion are each greater than one-half the length of the third housing portion 116.

Opposing sides 164 and 166 of the first housing portion 112 each slide and are thereby captured by opposing guide rails 172 and 174 on the side 132 of the third housing portion 116. Similarly, opposing sides 168 and 170 of the second housing portion 114 each slide and are thereby captured by opposing guide rails 172 and 174 on the side 132 of the third housing portion 116. The guide rails are raised above the side 132 of the third housing portion 116 to permit the first 112 and the second 114 housing portions to at least partially cover the side 132 when the housing portions 112 and 114 are in their closed housing position 118.

When the housing portions 112 and 114 are in their closed housing position 118, the side 164 of the first housing portion 112 slides past and over the side 168 of the second housing portion 114. Likewise, the side 166 of the first housing portion 112 slides past and over the side 170 of the second housing portion 114. The end portion 122 at the opposing sides 164 and 166 of the first housing portion 112 are disposed in grooves 176 and 178, respectively.

When the housing portions 112 and 114 are in their open housing position 120, conventional stops (not shown) at the end portion 122 of the first housing position 112 and the end portion 124 of the second housing portion 114 keep the housing portions 112 and 114 from separating from the third housing portion 116. The conventional stops also retain the housing portions 112 and 114 when the housing portions 112 and 114 are in their closed housing position 118.

The first and second housing portions 112 and 114 are shown to be slidably coupled to opposing guide rails 172 and 174 on the third housing portion 116. Alternatively, only one side of the first and second housing portions 112 and 114 need be slidably coupled to the third housing portion 116 given a robust design. For example, the side 164 of the first housing portion 112 slidably engages with guide rail 172 of the third housing portion 116 and the side 170 of the second housing portion 114 slidably engages with guide rail 174 of the third housing portion 116. Thus, absolutely, no overlap occurs between any part of the first and second housing portions 112 and 114.

A conventional earpiece transducer 126 is coupled to the first housing portion 112 and a conventional microphone transducer 128 is coupled to the second housing portion 128. The earpiece 126 and microphone 128 transducers are substantially aligned with a center axis 130 of the third housing portion 116. Conventional transceiving means (see FIG. 7), coupled to the earpiece 126 and microphone 128 transducers, is preferably disposed in the third housing portion 116.

In the closed housing position 118, the major surfaces of first 112 and second 114 housing portions are substantially disposed in the same plane and preferably adjacent to the side 132 of the third housing portion 116. Preferably, a side 134 of the first housing portion 112 is shaped to matively engage with a side 136 of the second housing portion 114. Such engagement permits the positioning of the first 112 and second 114 housing portions in the same plane adjacent to the side 132 of the third housing portion 116 while permitting the earpiece 126 and microphone 128 transducers to align with the center axis 130.

Note that in the closed position 118, the holes in the earpiece 126 and microphone 128 transducers are facing opposite to the side 132 of the third housing portion 116. This produces an opportunity for the user to use the earpiece and microphone transducers of the radiotelephone 110 when in its closed position 118. One such use includes a hands-free operation enabling the user to answer a call without opening the radiotelephone 100.

In the open housing position 120, the first housing portion 122 is disposed at an obtuse angle relative to the third housing portion 116, preferably 180°, permitting alignment of the earpiece transducer 126 with a human ear. Similarly, the second housing portion 114 is also disposed at an obtuse angle relative to the third housing portion 116, although preferably 180°, permitting alignment of the microphone transducer 128 with a human mouth. Both the earpiece 126 and microphone 128 transducers remain aligned with the center axis 130 when the first 112 and second 114 housing portions are in the open housing position 120.

Although it would be less desirable than the preferred embodiment, one of the first 112 and second 114 housing portions may overlap the other such that the first 112 and second 114 housing portions are disposed in different and preferably, substantially parallel planes.

The movement of the first housing portion 112 between the closed 118 and open 120 housing positions are coupled to the movement of the second housing portion 114 between the closed 118 and open 120 housing positions. Contrary to the rotating housing portions 12 and 14 of FIGS. 1 and 2, the housing portions 112 and 114 of FIGS. 3 and 4 do not interfere with each other and thus can be moved at the same time. Of course, elaborate coupling mechanisms may be employed to automatically open each of the first 112 and the second 114 housing portions.

The radiotelephone 110 is advantageous in that is contracted to approximately one third of its useable length when in its closed position 118 while providing only one additional layer of housing material. This results in a reduction in thickness of the device and a weight reduction approximately equal to that of one moveable housing portion. Furthermore, when the radiotelephone 110 is expanded to its open position 120, the earpiece 126 and microphone 128 transducers remain on the center axis 130 of the third housing portion 110 permitting convenient and comfortable alignment with a human ear and mouth.

The radiotelephone 110 further includes a display 146 and a data input device, such as a keypad 148, preferably coupled to the side 132 of the third housing portion 116. As the radiotelephone 110 becomes smaller, less space is available for the display 146 and keypad 148. However, radiotelephones are being designed with more capability to provide a greater range of services and thus need additional display 146 and keypad 148 resources to support the expanded capability. One such example of added capability is the addition of a selective call receiver functions, such as a conventional pager, to the functionality of the radiotelephone 110. Such expanded capability problems are overcome by relating paging and radiotelephone modes associated with the wireless communication device 110 to at least one of the first 112 and second 114 housing portions being moved between the closed 118 and open 120 positions.

The display functionality is expanded by displaying paging information when the first housing portion 112 is moved to the closed position 118 and radiotelephone information when the first housing portion 112 is moved to the open housing position 120.

The keypad functionality is expanded by having paging functions associated therewith when the first housing portion 112 is in the closed position 118 and radiotelephone functions associated therewith when the first housing portion 112 is moved to the open housing position 120.

As with FIGS. 1 and 2, the dual modes of the device are not limited to only radiotelephone and paging functions. This feature of the present invention is intended to include any to modes of the wireless communication device. For example, the dual modes alternatively include: radiotelephone vs. notebook functions, private vs. hands-free conversation and cellular vs. cordless functions.

The display 146 and keypad 148 are preferably covered by the moveable housing portions as shown in FIGS. 3 and 4, but do not necessarily need to be covered to gain the expanded functionality provided by the moveable housing portion as discussed with FIGS. 1 and 2.

Another unique feature of the wireless communication device 110 as shown in FIGS. 3 and 4 is a substantially transparent portion 150, hereinafter called a lens, coupled to the second housing portion 114. As similarly discussed with FIGS. 1 and 2, the lens 150 is coupled to the second 114 housing portion such that the lens is disposed essentially opposite at least a portion of the display 146 when the second 114 housing portion is moved to the closed housing position 118. Thus, the display capability is expanded since it can now be used when the second housing portion is in its closed position 118. Of course, the lens may optionally be coupled to both of the moveable housing portions 112 and 114 if so desired. In accordance with the previously taught feature, the covered display 146 provides paging information when the housing portions are moved to their closed housing position 118 and radiotelephone information when the housing portions are moved to their open 120 housing position.

Still another unique feature of the wireless communication device 10 as shown in FIGS. 3 and 4 is keycap means 152 coupled to the second housing portion 114. As discussed with FIGS. 1 and 2, the keycaps 152 are coupled to the second housing portion 114 such that the keycaps 152 are disposed essentially opposite at least a portion of the keypad 154 when the second housing portion 114 is moved to the closed housing position 118. The keycaps 152 are comprised of conventional elastomeric material and protrude through the thickness of the second housing portion 114. The keycaps 152 are coupled to the second housing portion 114 by sandwiching webbing interconnecting individual keycaps between layers of the second housing portion 114. Thus, the keypad capability is expanded since it can now be used when the second housing portion 114 is in its closed position 118. Of course, additional keycaps may also be coupled to the first housing portion 112 if so desired. In accordance with the previously taught feature, the covered portion of the keypad 154 provides paging functions when the second housing portion 114 is moved to its closed housing position 118 and radiotelephone functions when the second housing portion 114 is moved to its open 120 housing position.

Yet, still another unique feature of the wireless communication device 110 as shown in FIGS. 3 and 4 is an antenna 156 coupled to the first housing portion 112. A transceiver (FIG. 7) is substantially disposed in the third housing portion 116. The antenna 156 is coupled to the transceiver and the first housing portion 112. The antenna 156 is moveable between a first, closed, antenna position designated by reference numeral 160 at pocket 158 and a second, open, antenna position designated by reference numeral 162 extended beyond the first housing portion 112. The antenna 156 is shown to be slidably coupled to the first housing portion 112 between antenna positions 160 and 162. The antenna preferably extends beyond the housing portion having the earpiece transducer 126 such that the antenna extends above a human head.

For miniature radiotelephone 110 having the length of the first housing portion 112 approximately equal to the length of the third housing portion 116, an antenna extending beyond the third housing portion 116 would not reach beyond the length of the first housing portion 112. In this position the shadowing phenomenon reduces the performance of the antenna 156. However, extending the antenna 156 beyond the first, moveable housing portion 112 raises the antenna 156 to an even further extended position away from the radiotelephone 110 and therefore overcomes the shadowing problem resulting in improved antenna performance.

Referring now to FIGS. 5 and 6, there are shown perspective views of a radiotelephone 200 in an open and closed position, respectively, constructed in accordance with a third preferred embodiment of the present invention. The radiotelephone 200 is the same as the radiotelephone 100 shown in FIGS. 3 and 3 and described in the associated text with the following one exception. The second housing portion 214 is rotatably coupled to the third housing portion 216 rather than being slidably coupled. Therefore, a combination of sliding and rotating moveable housing portions is shown.

The radiotelephone 200 comprises a housing assembly having first 212, second 214 and third 216 housing portions. The first 212 and second 214 housing portions are each coupled to the third 216 housing portion. The third housing portion includes a side 232. The first 212 and second 214 housing portions are each moveable between a first, closed position, designated by reference numeral 218 in FIG. 5 and shown in FIG. 6, and a second, open position, designated by reference numeral 220 in FIG. 5 and shown in FIG. 5. The first housing portion 212 is moveable between a first housing position 218 at least partially covering a side 232 of the third housing portion 216 and a second housing position 220 at least partially exposing the side 232 of the third housing portion 216. The second housing portion 214 is moveable between a first housing position 218 at least partially covering the side 232 of the third housing portion 216 and a second housing position 220 at least partially exposing the side 232 of the third housing portion 216.

A unique feature of the radio telephone 210 is readily apparent from viewing both FIGS. 5 and 6. The first housing portion 212 has an end portion 222. The second housing portion 214 has an end portion 224 extending beyond the end portion 222 of the first housing portion 212 when the first 212 and the second 214 housing portions are moved to their first housing positions 218 and at least partially covering the side 232 of the third housing portion 216. Preferably, the length of the first 212 housing portion and the length of the second 214 housing portion are each greater than one-half the length of the third housing portion 216.

Opposing sides 264 and 266 of the first housing portion 212 each slide and are thereby captured by opposing guide rails 272 and 274 on the side 232 of the third housing portion 216. The guide rails are raised above the side 232 of the third housing portion 216 to permit the first 212 housing portion to at least partially cover the side 232 when the first housing portions 212 is in its closed housing position 218.

The second housing portion 214 is rotatably coupled to the third housing portion 216 between the closed 218 and open 220 housing positions via hinge mechanism 240. The second housing portion 214 is manually rotated between the open 218 and closed 220 position. The hinge mechanism also retains second housing portion 214 the closed 218 and open 220 housing positions. Conventional hinge mechanisms are acceptable for use with the present invention.

When the housing portions 212 and 214 are in their closed housing position 218, the side 264 of the first housing portion 212 slides past the side 268 of the second housing portion 214. Likewise, the side 266 of the first housing portion 212 slides past the side 270 of the second housing portion 214.

When the first housing portion 212 is in its open housing position 220, conventional stops (not shown) at the end portion 222 of the first housing position 212 keep the first housing portion 212 from separating from the third housing portion 216. The conventional stops also retain the first housing portion 212 when the first housing portion 212 is in its closed housing position 218.

The first housing portion 212 is shown to be slidably coupled to opposing guide rails 272 and 274 on the third housing portion 216. Alternatively, only one side of the first housing portion 212 need be slidably coupled to the third housing portion 216 given a robust design. For example, the side 264 of the first housing portion 212 slidably engages with guide rail 272 of the third housing portion 216 only.

A conventional earpiece transducer 226 is coupled to the first housing portion 212 and a conventional microphone transducer 228 is coupled to the second housing portion 228. The earpiece 226 and microphone 228 transducers are substantially aligned with a center axis 230 of the third housing portion 216. Conventional transceiving means (see FIG. 7), coupled to the earpiece 226 and microphone 228 transducers, is preferably disposed in the third housing portion 216.

In the closed housing position 218, the major surfaces of first 212 and second 214 housing portions are substantially disposed in the same plane and preferably adjacent to the side 232 of the third housing portion 216. Preferably, a side 234 of the first housing portion 212 is shaped to matively engage with a side 236 of the second housing portion 214. Such engagement permits the positioning of the first 212 and second 214 housing portions in the same plane adjacent to the side 232 of the third housing portion 216 while permitting the earpiece 226 and microphone 128 transducers to align with the center axis 230.

Note that in the closed position 218, the holes in the earpiece transducer 226 is facing opposite to the side 232 of the third housing portion 216 and microphone transducer 228 is facing towards the side 232 of the third housing portion 216.

In the open housing position 220, the first housing portion 222 is disposed at an obtuse angle relative to the third housing portion 216, preferably 180°, permitting alignment of the earpiece transducer 226 with a human ear. Similarly, the second housing portion 214 is also disposed at an obtuse angle relative to the third housing portion 216, although preferably 135°, permitting alignment of the microphone transducer 228 with a human mouth. Both the earpiece 226 and microphone 228 transducers remain aligned with the center axis 230 when the first 212 and second 214 housing portions are in the open housing position 220.

Although it would be less desirable than the preferred embodiment, one of the first 212 and second 214 housing portions may overlap the other such that the first 212 and second 214 housing portions are disposed in different and preferably, substantially parallel planes.

The movement of the first housing portion 212 between the closed 218 and open 220 housing positions are coupled to the movement of the second housing portion 214 between the closed 218 and open 220 housing positions. Contrary to the rotating housing portions 12 and 14 of FIGS. 1 and 2, the housing portions 212 and 214 of FIGS. 3 and 4 do not interfere with each other and thus can be moved at the same time. Of course, elaborate coupling mechanisms may be employed to automatically open each of the first 212 and the second 214 housing portions.

The radiotelephone 210 is advantageous in that is contracted to approximately one third of its useable length when in its closed position 218 while providing only one additional layer of housing material. This results in a reduction in thickness of the device and a weight reduction approximately equal to that of one moveable housing portion. Furthermore, when the radiotelephone 210 is expanded to its open position 220, the earpiece 226 and microphone 228 transducers remain on the center axis 230 of the third housing portion 210 permitting convenient and comfortable alignment with a human ear and mouth.

The radiotelephone 210 further includes a display 246 and a data input device, such as a keypad 248, preferably coupled to the side 232 of the third housing portion 216. As the radiotelephone 210 becomes smaller, less space is available for the display 246 and keypad 248. However, radiotelephones are being designed with more capability to provide a greater range of services and thus need additional display 246 and keypad 248 resources to support the expanded capability. One such example of added capability is the addition of a selective call receiver functions, such as a conventional pager, to the functionality of the radiotelephone 210. Such expanded capability problems are overcome by relating paging and radiotelephone modes associated with the wireless communication device 210 to at least one of the first 212 and second 214 housing portions being moved between the closed 218 and open 220 positions.

The display functionality is expanded by displaying paging information when the second housing portion 214 is moved to the closed position 218 and radiotelephone information when the second housing portion 214 is moved to the open housing position 220.

The keypad functionality is expanded by having paging functions associated therewith when the second housing portion 214 is in the closed position 218 and radiotelephone functions associated therewith when the second housing portion 214 is moved to the open housing position 220.

As with FIGS. 1 and 2, the dual modes of the device are not limited to only radiotelephone and paging functions. This feature of the present invention is intended to include any to modes of the wireless communication device. For example, the dual modes alternatively include: radiotelephone vs. notebook functions, private vs. hands-free conversation and cellular vs. cordless functions.

The display 246 and keypad 248 are preferably covered by the moveable housing portions as shown in FIGS. 5 and 6, but do not necessarily need to be covered to gain the expanded functionality provided by the moveable housing portion as discussed with FIGS. 1 and 2.

Another unique feature of the wireless communication device 210 as shown in FIGS. 5 and 6 is a substantially transparent portion 250, hereinafter called a lens, coupled to the second housing portion 214. As similarly discussed with FIGS. 1 and 2, the lens 250 is coupled to the second 214 housing portion such that the lens is disposed essentially opposite at least a portion of the display 246 when the second 214 housing portion is moved to the closed housing position 218. Thus, the display capability is expanded since it can now be used when the second housing portion is in its closed position 218. Of course, the lens may optionally be coupled to both of the moveable housing portions 212 and 214 if so desired. In accordance with the previously taught feature, the covered display 246 provides paging information when the housing portions are moved to their closed housing position 228 and radiotelephone information when the housing portions are moved to their open 220 housing position.

Still another unique feature of the wireless communication device 100 as shown in FIGS. 5 and 6 is keycap means 252 coupled to the second housing portion 214. As discussed with FIGS. 1 and 2, the keycaps 252 are coupled to the second housing portion 214 such that the keycaps 252 are disposed essentially opposite at least a portion of the keypad 254 when the second housing portion 214 is moved to the closed housing position 218. The keycaps 252 are comprised of conventional elastomeric material and protrude through the thickness of the second housing portion 214. The keycaps 252 are coupled to the second housing portion 214 by sandwiching webbing interconnecting individual keycaps between layers of the second housing portion 214. Thus, the keypad capability is expanded since it can now be used when the second housing portion 214 is in its closed position 218. Of course, additional keycaps may also be coupled to the first housing portion 212 if so desired. In accordance with the previously taught feature, the covered portion of the keypad 254 provides paging functions when the second housing portion 214 is moved to its closed housing position 218 and radiotelephone functions when the second housing portion 214 is moved to its open 220 housing position.

Yet, still another unique feature of the wireless communication device 210 as shown in FIGS. 3 and 4 is an antenna 256 coupled to the first housing portion 212. A transceiver (FIG. 7) is substantially disposed in the third housing portion 216. The antenna 256 is coupled to the transceiver and the first housing portion 212. The antenna 256 is moveable between a first, closed, antenna position designated by reference numeral 260 at pocket 158 and a second, open, antenna position designated by reference numeral 262 extended beyond the first housing portion 212. The antenna 256 is shown to be slidably coupled to the first housing portion 212 between antenna positions 260 and 262. The antenna preferably extends beyond the housing portion having the earpiece transducer 226 such that the antenna extends above a human head.

For miniature radiotelephone 210 having the length of the first housing portion 212 approximately equal to the length of the third housing portion 216, an antenna extending beyond the third housing portion 216 would not reach beyond the length of the first housing portion 212. In this position the shadowing phenomenon reduces the performance of the antenna 256. However, extending the antenna 256 beyond the first, moveable housing portion 212 raises the antenna 256 to an even further extended position away from the radiotelephone 210 and therefore overcomes the shadowing problem resulting in improved antenna performance.

Referring now to FIG. 7, there is shown a block diagram of the radiotelephone 700 representing the functional blocks of the radiotelephones 10 of FIGS. 1 and 2, 100 of FIGS. 3 and 4 and 200 of FIGS. 5 and 6. The radiotelephone 700 generally includes an antenna 701, a receiver 702, memory 703, a display 704, a keypad 705, a processor 706, a speaker 707, a microphone 708, a transmitter 709, an alert transducer 710, a switch 711 and a power supply 712. The memory 703 includes conventional read only memory (ROM), random access memory (RAM) and electrically erasable programmable read only memory (EEPROM) and may be external or internal to the processor 706. The radiotelephone 700 is of a cellular portable type such as model number F09HYD8363BG manufactured and available from Motorola Inc. 600 North U.S. Highway 45, Libertyville, Ill. 60048.

Optionally, the radiotelephone 700 is coupled to a selective call receiver unit, or pager 713. The selective call receiver is of the type such as model number A04JRC5661A, manufactured and available from Motorola Inc. 1500 N.W. 22nd Avenue, Boynton Beach, Fla. 33426-8292.

The details in FIG. 7 either represented as a radiotelephone 700 in blocks 701–712 or in combination with a pager 713 and their functional relationship therebetween are well known in the art and will not be described further except to distinguish between what is well known and that described in the preferred embodiments of the present invention.

As discussed with FIGS. 1–6, the radiotelephone 700 performs certain tasks responsive to the position of the moveable housing portions. This is accomplished using the switch 711. When the housing portion is in its closed position, the switch is closed circuited and thereby sends a control signal of a logic low to the processor. Likewise, when the housing portion is in its open position, the switch is open circuited and thereby sends a control signal of a logic high to the processor.

The processor 706 is programmed with a predetermined set of instructions which control the functions of the shown blocks of the radiotelephone 700 based on the control signal sent to the processor from the switch. Thus, for example, the processor can adaptively reconfigure the keypad 705 and display 704 for either radiotelephone or paging modes depending upon the state of the switch 711.

What is claimed is:

1. A portable communication device comprising:

a first housing portion;

a second housing portion;

a third housing portion having a side including a first area and a second area, wherein the first area and the second area are mutually exclusive, and wherein each of the first area and the second area contributes to a total area of the side of the third housing portion;

a first attachment mechanism for mechanically coupling the first housing portion to the third housing portion and permitting the first housing portion to move relative to the third housing portion between a stowed position and an unstowed position, wherein at least a part of the first housing portion is disposed on the side of the third housing portion and is disposed in the first area of the side of the third housing portion when the first housing portion is located in the stowed position, and wherein the first housing portion is disposed at an obtuse angle relative to the side of the third housing portion when the first housing portion is located in the unstowed position; and a second attachment mechanism for mechanically coupling the second housing portion to the third housing portion and permitting the second housing portion to move relative to the third housing portion between a stowed position and an unstowed position, wherein at least a part of the second housing portion is disposed on the side of the third housing portion and is disposed in the second area of the side of the third housing portion when the second housing portion is located in the stowed position, and wherein the second housing portion is disposed at an obtuse angle relative to the side of the third housing portion when the second housing portion is located in the unstowed position;

wherein the at least a part of the first housing portion and the at least a part of the second housing portion are each disposed in a first housing plane, having a thickness of one of the at least a part of the first housing portion and the at least a part of the second housing portion, when the first housing portion and the second housing portion are each located in their respective stowed positions, wherein the third housing portion is disposed in a second housing plane having a thickness of the third housing portion, and wherein the portable communication device has a thickness substantially equal to the thickness of the first housing plane and the second housing plane when the first housing portion and the second housing portion are each located in their respective stowed positions, and wherein an end of the first housing portion extends beyond an end of the second housing portion when the first housing portion and the second housing portion are each located in their respective stowed positions.

2. A portable communication device according to claim 1 wherein the third housing portion has a longitudinal axis substantially centered on the third housing portion, and wherein the at least a part of the first housing portion and the at least a part of the second housing portion are substantially aligned with the longitudinal axis when the first housing portion and the second housing portion are each located in their respective unstowed positions.

3. A portable communication device according to claim 2 wherein each of the first area and the second area extends across the longitudinal axis, and wherein the at least a part of the first housing portion and the at least a part of the second housing portion are substantially aligned with the longitudinal axis when the first housing portion and the second housing portion are each located in their respective stowed positions.

4. A portable communication device according to claim 2 further comprising:
   an earpiece carried by the first housing portion; and
   a microphone carried by one of the second housing portion and the third housing portion,
   wherein the earpiece and the microphone are substantially aligned with the longitudinal axis when the first housing portion and the second housing portion are each located in their respective unstowed positions.

5. A portable communication device according to claim 4 wherein the third housing portion further comprises:
   a receiver coupled to the earpiece and carried by the third housing; and
   a transmitter coupled to the microphone and carried by the third housing.

6. A portable communication device according to claim 1 wherein at least one of the first attachment mechanism and the second attachment mechanism further comprises:
   a hinge mechanism.

7. A portable communication device according to claim 1 wherein at least one of the first attachment mechanism and the second attachment mechanism further comprises:
   a slide mechanism.

8. A portable communication device according to claim 1 further comprising:
   a display carried by the side of the third housing portion; and
   a keypad carried by the side of the third housing portion.

9. A portable communication device according to claim 1 further comprising:
   a coupler for translating movement of the first housing portion relative to the third housing portion between the stowed position and the unstowed position to movement of the second housing portion relative to the third housing portion between the stowed position and the unstowed position, respectively.

10. A portable communication device according to claim 1 further comprising:
    a retainer for retaining at least one of the first housing portion and the second housing portion in at least one of the stowed position and the unstowed position when the at least one of the first housing portion and the second housing portion, respectively, is located the stowed position and the unstowed position, respectively.

11. A portable communication device according to claim 1 wherein the portable communication device operates as a pager when at least one of the first housing portion and the second housing portion is located in the stowed position and operates as a telephone when the at least one of the first housing portion and the second housing portion is located in the unstowed position.

12. A portable communication device according to claim 1 further comprising:
    a data output unit providing a first information set when at least one of the first housing portion and the second housing portion is located in the stowed position, and for providing a second information set when at least one of the first housing portion and the second housing portion is located in the unstowed position.

13. A portable communication device according to claim 12 wherein the data output unit is a display.

14. A portable communication device according to claim 1 further comprising:
    a display for providing visual information to a user of the portable communication device, wherein the display is carried by the third housing portion in such a manner that a visual information presenting surface of the display is disposed in at least one of the first area and the second area of the side of the third housing portion; and
    a lens mechanically coupled to at least one of the at least a part of the first housing portion and the at least a part of the second housing portion and disposed essentially opposite to at least a portion of the display when the at least one of the first housing portion and the second housing portion is located in the stowed position to permit the visual information to be viewed by the user of the portable communication device when the at least one of the first housing portion and the second housing portion is located in the stowed position.

15. A portable communication device according to claim 1 further comprising:
    a data input unit for providing first input information when at least one of the first housing portion and the second housing portion is located in the stowed position, and for providing second input information when the at least one of the first housing portion and the second housing portion n is located in the unstowed position.

16. A portable communication device according to claim 15 wherein the data input unit is a keypad.

17. A portable communication device according to claim 1 further comprising:
    a keypad adapted to receive a tactile force from a user of the portable communication device to permit the user to enter information into the the portable communication device, wherein the keypad is carried by the third housing portion in such a manner that at least a portion of the keypad is disposed in at least one of the first area and the second area of the side of the third housing portion;
    a keycap mechanically coupled to one of the first housing portion and the second housing portion, extending through the thickness of the one of the first housing portion and the second housing portion, respectively, and disposed essentially opposite to the portion of the keypad when the at least one of the first housing portion and the second housing portion is located in the stowed position to permit the user to enter information into the the portable communication device when the at least one of the first housing portion and the second housing portion, respectively, is located in the stowed position by applying the tactile force on the keycap which in turn applies the tactile force to the portion of the keypad.

18. A portable communication device according to claim 1 wherein a distance between a distal end of the first housing portion and a distal end of the second housing portion is less than or equal to the length of the third housing portion when the first housing portion and the second housing portion are each located in their respective stowed positions, and wherein the distance between the distal end of the first housing portion and the distal end of the second housing portion is greater than twice the length of the third housing portion when the first housing portion and the second housing portion are each located in their respective unstowed positions.

19. A portable communication device comprising:

a first housing portion;

a second housing portion;

a third housing portion having a side including a first area and a second area, wherein the first area and the second area are mutually exclusive, wherein each of the first area and the second area contributes to a total area of the side of the third housing portion, wherein the third housing portion has a longitudinal axis substantially centered on the third housing portion, and wherein each of the first area and the second area extends across the longitudinal axis;

an earpiece carried by the first housing portion;

a microphone carried by one of the second housing portion and the third housing portion;

a receiver coupled to the earpiece and carried by the third housing;

a transmitter coupled to the microphone and carried by the third housing;

a first attachment mechanism for mechanically coupling the first housing portion to the third housing portion and permitting the first housing portion to move relative to the third housing portion between a stowed position and an unstowed position, wherein at least a part of the first housing portion is disposed on the side of the third housing portion and is disposed in the first area of the side of the third housing portion when the first housing portion is located in the stowed position, and wherein the first housing portion is disposed at an obtuse angle relative to the side of the third housing portion when the first housing portion is located in the unstowed position; and a second attachment mechanism for mechanically coupling the second housing portion to the third housing portion and permitting the second housing portion to move relative to the third housing portion between a stowed position and an unstowed position, wherein at least a part of the second housing portion is disposed on the side of the third housing portion and is disposed in the second area of the side of the third housing portion when the second housing portion is located in the stowed position, and wherein the second housing portion is disposed at an obtuse angle relative to the side of the third housing portion when the second housing portion is located in the unstowed position;

wherein the at least a part of the first housing portion and the at least a part of the second housing portion are each disposed in a first housing plane, having a thickness of one of the at least a part of the first housing portion and the at least a part of the second housing portion, when the first housing portion and the second housing portion are each located in their respective stowed positions, wherein the third housing portion is disposed in a second housing plane having a thickness of the third housing portion, and wherein the portable communication device has a thickness substantially equal to the thickness of the first housing plane and the second housing plane when the first housing portion and the second housing portion are each located in their respective stowed positions, wherein an end of the first housing portion extends beyond an end of the second housing portion when the first housing portion and the second housing portion are each located in their respective stowed positions, and wherein the at least a part of the first housing portion and the at least a part of the second housing portion are substantially aligned with the longitudinal axis when the first housing portion and the second housing portion are each located in their respective stowed positions and when the first housing portion and the second housing portion are each located in their respective unstowed positions, wherein the earpiece and the microphone are substantially aligned with the longitudinal axis when the first housing portion and the second housing portion are each located in their respective unstowed positions and when the first housing portion and the second housing portion are each located in their respective unstowed positions.

20. A portable communication device comprising:

a first housing portion;

a second housing portion;

a third housing portion having a side including a first area and a second area, wherein the first area and the second area are mutually exclusive, wherein each of the first area and the second area contributes to a total area of the side of the third housing portion, wherein the third housing portion has a longitudinal axis substantially centered on the third housing portion, and wherein each of the first area and the second area extends across the longitudinal axis;

an earpiece carried by the first housing portion;

a microphone carried by one of the second housing portion and the third housing portion;

a receiver coupled to the earpiece and carried by the third housing;

a transmitter coupled to the microphone and carried by the third housing;

a first attachment mechanism for mechanically coupling the first housing portion to the third housing portion and permitting the first housing portion to move relative to the third housing portion between a stowed position and an unstowed position, wherein at least a part of the first housing portion is disposed on the side of the third housing portion and is disposed in the first area of the side of the third housing portion when the first housing portion is located in the stowed position, and wherein the first housing portion is disposed at an obtuse angle relative to the side of the third housing portion when the first housing portion is located in the unstowed position;

a second attachment mechanism for mechanically coupling the second housing portion to the third housing portion and permitting the second housing portion to move relative to the third housing portion between a stowed position and an unstowed position, wherein at least a part of the second housing portion is disposed on the side of the third housing portion and is disposed in the second area of the side of the third housing portion when the second housing portion is located in the stowed position, and wherein the second housing portion is disposed at an obtuse angle relative to the side of the third housing portion when the second housing portion is located in the unstowed position;

a display for providing visual information to a user of the portable communication device, wherein the display is carried by the third housing portion in such a manner that a visual information presenting surface of the display is disposed in at least one of the first area and the second area of the side of the third housing portion;

a lens mechanically coupled to at least one of the at least a part of the first housing portion and the at least a part of the second housing portion and disposed essentially opposite to at least a portion of the display when the at least one of the first housing portion and the second housing portion is located in the stowed position to permit the visual information to be viewed by the user of the portable communication device when the at least one of the first housing portion and the second housing portion is located in the stowed position;

a keypad adapted to receive a tactile force from a user of the portable communication device to permit the user to enter information into the the portable communication device, wherein the keypad is carried by the third housing portion in such a manner that at least a portion of the keypad is disposed in at least one of the first area and the second area of the side of the third housing portion; and a keycap mechanically coupled to one of the first housing portion and the second housing portion, extending through the thickness of the one of the first housing portion and the second housing portion, respectively, and disposed essentially opposite to the portion of the keypad when the at least one of the first housing portion and the second housing portion is located in the stowed position to permit the user to enter information into the the portable communication device when the at least one of the first housing portion and the second housing portion, respectively, is located in the stowed position by applying the tactile force on the keycap which in turn applies the tactile force to the portion of the keypad;

wherein the at least a part of the first housing portion and the at least a part of the second housing portion are each disposed in a first housing plane, having a thickness of one of the at least a part of the first housing portion and the at least a part of the second housing portion, when the first housing portion and the second housing portion are each located in their respective stowed positions, wherein the third housing portion is disposed in a second housing plane having a thickness of the third housing portion, and wherein the portable communication device has a thickness substantially equal to the thickness of the first housing plane and the second housing plane when the first housing portion and the second housing portion are each located in their respective stowed positions, wherein an end of the first housing portion extends beyond an end of the second housing portion when the first housing portion and the second housing portion are each located in their respective stowed positions, and wherein the at least a part of the first housing portion and the at least a part of the second housing portion are substantially aligned with the longitudinal axis when the first housing portion and the second housing portion are each located in their respective stowed positions and when the first housing portion and the second housing portion are each located in their respective unstowed positions, wherein the earpiece and the microphone are substantially aligned with the longitudinal axis when the first housing portion and the second housing portion are each located in their respective unstowed positions and when the first housing portion and the second housing portion are each located in their respective unstowed positions.

* * * * *